United States Patent
You (10) Patent No.: US 12,054,141 B2
(45) Date of Patent: Aug. 6, 2024

(54) DEVICE AND METHOD FOR REDUCING COLLISION RISK

(71) Applicant: HL Klemove Corp., Pyeongtaek-si (KR)

(72) Inventor: HoJeong You, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 216 days.

(21) Appl. No.: 17/389,600

(22) Filed: Jul. 30, 2021

(65) Prior Publication Data
US 2022/0032906 A1     Feb. 3, 2022

(30) Foreign Application Priority Data

Jul. 31, 2020   (KR) .................. 10-2020-0096038

(51) Int. Cl.
*B60W 30/09*     (2012.01)
*B60K 35/23*     (2024.01)
(Continued)

(52) U.S. Cl.
CPC ............ *B60W 30/09* (2013.01); *B60W 30/08* (2013.01); *B60W 30/0956* (2013.01);
(Continued)

(58) Field of Classification Search
None
See application file for complete search history.

(56) References Cited

U.S. PATENT DOCUMENTS

2011/0288774 A1*  11/2011  Bengtsson ............ G08G 1/165
                                                                    701/301
2012/0101701 A1     4/2012  Moshchuk et al.
(Continued)

FOREIGN PATENT DOCUMENTS

CN          102452396 A      5/2012
CN          106627571 A      5/2017
(Continued)

OTHER PUBLICATIONS

Notice of Allowance issued Sep. 26, 2023 for counterpart Chinese Patent Application No. 202110868214.0.
(Continued)

*Primary Examiner* — Christian Chace
*Assistant Examiner* — Shayne M. Gilbertson
(74) *Attorney, Agent, or Firm* — Harvest IP Law, LLP (57) ABSTRACT

The disclosure relates to a collision risk reduction device and method. According to the disclosure, a device for reducing a risk of collision comprises a receiver receiving, from a sensor, object information, an interval setting unit setting an interval predetermined in left and right directions of a traveling direction of the host vehicle, as a first reference interval, and setting an interval, which is a predetermined length larger than the first reference interval, as a second reference interval, a controller determining a type of the object based on the object information if the object approaches within the second reference interval and setting an alarm including the type and location of the object and, if the object approaches within the first reference interval, setting an alarm for avoiding collision with the object based on the type of the object, and an output unit outputting the set alarms.

20 Claims, 8 Drawing Sheets

(51) Int. Cl.
   *B60W 30/08* (2012.01)
   *B60W 30/095* (2012.01)
   *B60W 30/18* (2012.01)
   *B60W 50/14* (2020.01)

(52) U.S. Cl.
   CPC ...... *B60W 30/18163* (2013.01); *B60W 50/14* (2013.01); *B60K 35/23* (2024.01); *B60W 2050/143* (2013.01); *B60W 2420/403* (2013.01); *B60W 2554/20* (2020.02); *B60W 2554/4029* (2020.02); *B60W 2554/4049* (2020.02)

(56) References Cited

U.S. PATENT DOCUMENTS

| | | | |
|---|---|---|---|
| 2014/0278059 A1* | 9/2014 | Gunther | G01C 21/3697 701/414 |
| 2015/0213718 A1* | 7/2015 | Ono | B60Q 9/008 340/435 |
| 2017/0124877 A1 | 5/2017 | Sim | |
| 2018/0247538 A1 | 8/2018 | Baek | |
| 2020/0247398 A1* | 8/2020 | Miyamoto | G01S 13/58 |
| 2020/0290607 A1* | 9/2020 | Mielenz | B60W 30/09 |
| 2021/0046822 A1* | 2/2021 | Kleen | G06T 19/006 |
| 2022/0024495 A1* | 1/2022 | Mell | G06N 20/00 |

FOREIGN PATENT DOCUMENTS

| | | |
|---|---|---|
| CN | 108099906 A | 6/2018 |
| CN | 108510796 A | 9/2018 |
| DE | 102012014624 A1 | 1/2013 |
| JP | 2002-260192 A | 9/2002 |
| JP | 2008-97501 A | 4/2008 |
| JP | 6113375 B2 | 4/2017 |
| KR | 10-2002-0085124 A | 11/2002 |
| KR | 10-2017-0041795 A | 4/2017 |
| KR | 10-2018-0011470 A | 2/2018 |

OTHER PUBLICATIONS

Office action issued Jun. 29, 2023 for counterpart Chinese Patent Application No. 202110868214.0.

* cited by examiner

DEVICE AND METHOD FOR REDUCING COLLISION RISK

CROSS-REFERENCE TO RELATED APPLICATION

This application claims priority from Korean Patent Application No. 10-2020-0096038, filed on Jul. 31, 2020, which is hereby incorporated by reference for all purposes as if fully set forth herein.

BACKGROUND

Field

The disclosure relates to a device and method for reducing collision risk and, more specifically, to a device and method for reducing collision risk, which sets an alarm for reducing collision risk through information for an object.

Description of Related Art

While driving on the road, a vehicle has a high risk of collision with an unexpected child, animal, or bicyclist crossing. In particular, driving at night increases the risk of collision. Autonomous emergency braking (AEB) systems may reduce the risk of crashes.

An AEB system equipped in a vehicle may avoid a collision by alerting the driver to the risk of collision or braking to a complete stop depending on the risk of collision with a detected hazard, such as a preceding moving object (e.g., another vehicle) or an external object (e.g., a pedestrian, a sidewalk block, a guard rail, or curb). As widely adopted and standardized, AEB systems require applicability in more scenario cases and more stability than conventional ones.

However, it is not easy to enable AEB systems to respond to all probable collision risks due to delays in recognition and control and accuracy issues with target selection.

BRIEF SUMMARY

According to embodiments of the disclosure, there is provided a device and method for reducing collision risk, which sets a first interval reference line and a second interval reference line and sets an alarm depending on the type of an object.

According to an embodiment of the disclosure, there is provided a device for reducing a risk of collision, comprising a receiver receiving, from a sensor, object information for an object approaching within a predetermined distance of a host vehicle, an interval setting unit setting an interval predetermined in left and right directions of a traveling direction of the host vehicle, as a first reference interval, and setting an interval, which is a predetermined length larger than the first reference interval, as a second reference interval, a controller determining a type of the object based on the object information if the object approaches within the second reference interval and setting an alarm including the type and location of the object and, if the object approaches within the first reference interval, setting an alarm for avoiding collision with the object based on the type of the object, and an output unit outputting the set alarms.

According to an embodiment of the disclosure, there is provided a method for reducing a risk of collision, comprising an object detection step receiving, from a sensor, object information for an object approaching within a predetermined distance of a host vehicle, a reference interval setting step setting an interval predetermined in left and right directions of a traveling direction of the host vehicle, as a first reference interval, and setting an interval, which is a predetermined length larger than the first reference interval, as a second reference interval, a second reference interval alarm setting step determining a type of the object based on the object information if the object approaches within the second reference interval and setting an alarm including the type and location of the object, a first reference interval alarm setting step setting an alarm for avoiding collision with the object based on the type of the object if the object approaches within the first reference interval, and an alarm output step controlling to output the set alarms.

According to the disclosure, the collision risk reduction device may set an alarm depending on a preset interval and the type of an object. Thus, it is possible to provide a collision risk reduction device and method that may set an alarm for rapid and precise collision avoidance.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

A collision risk reduction device 10 is described below with reference to FIG. 1 according to an embodiment of the disclosure.

Figure 1:
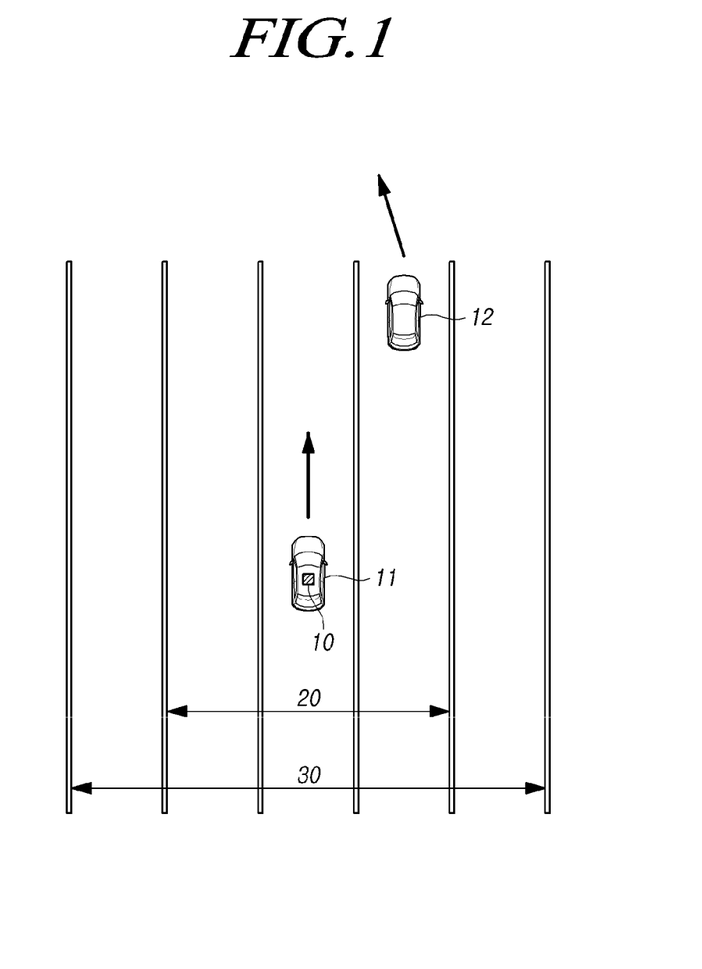
FIG. 1 is a view illustrating a collision risk reduction device according to an embodiment of the disclosure.

FIG. 1 is a view illustrating a collision risk reduction device 10 according to an embodiment of the disclosure.

Referring to FIG. 1, the collision risk reduction device 10 may detect an object 12, obtain information for the object 12, and set a first reference interval 20 and a second reference interval 30. If the object 12 approaches within the second reference interval 30, the collision risk reduction device 10 may determine the type of the object 12 and set an alarm including the location and type of the object 12. If the object approaches within the first reference interval 20, the collision risk reduction device 10 may set and output an alarm for collision avoidance from the object 12 based on the type of the object 12.

The first reference interval 20 and the second reference interval 30 are intervals set to provide information for the object 12 to the driver of the host vehicle 11 and may be set in left and right directions of the traveling direction of the host vehicle 11. The second reference interval 30 may be a reference interval to draw attention to the presence of the object 12 by an alarm. The first reference interval 20 may be a reference interval to indicate that the host vehicle 11 needs to come to a stop since the object 12 may be hazardous to the driving of the host vehicle 11.

The host vehicle 11 may be equipped with a driver assist system including the collision risk reduction device 10.

The object 12 may be a vehicle, an animal, a pedestrian, a cyclist, and an obstacle.

Figure 2:
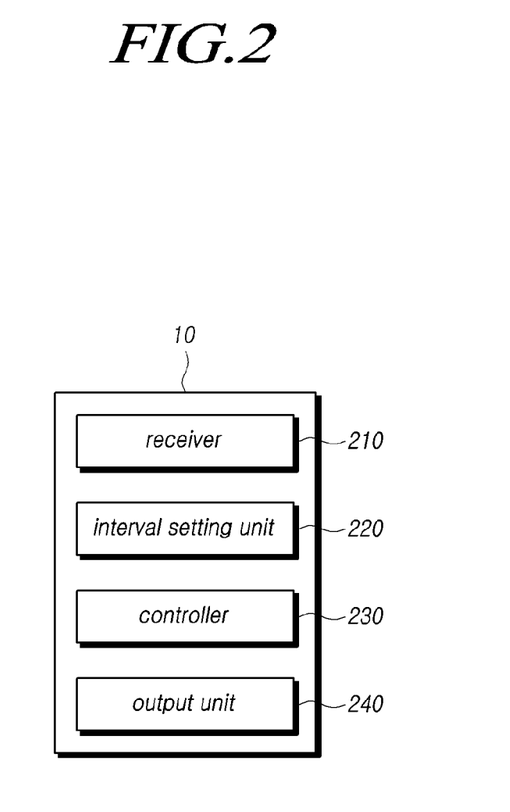
FIG. 2 is a block diagram illustrating a collision risk reduction device according to an embodiment of the disclosure.

FIG. 2 is a block diagram illustrating a collision risk reduction device 10 according to an embodiment of the disclosure.

Referring to FIG. 2, the collision risk reduction device 10 may include a receiver 210, an interval setting unit 220, a controller 230, and an output unit 240.

The receiver 210 may obtain object information for the object 12 approaching within a predetermined distance from the host vehicle 11, detected by a sensor.

The sensor may include at least one of an image sensor, such as a camera to detect the above-described object 12, a lidar system that implements the surroundings as a three dimension (3D) model, or a laser sensor or infrared (IR) sensor capable of measuring a distance.

Radar sensors or radar system used according to the disclosure may include one or more of at least one radar sensor unit, e.g., a front detection radar sensor mounted on the front of the vehicle, a rear radar sensor mounted on the rear of the vehicle, and side or rear side/rear radar sensor mounted on each side of the vehicle. The radar sensors or radar system may analyze the transmission signal and reception signal to process data, thereby detecting information for the object 12. To that end, the radar sensors or radar system may include an electronic control unit (ECU) or a processor. Data transmission or signal communication from the radar sensor to the ECU may use a communication link, such as a suitable vehicle network bus.

The receiver 210 may obtain such information as the distance from the object 12, type of the object 12, traveling direction of the object 12, and expected location of collision with the object 12 from the object information.

The receiver 210 may further receive information for a stationary object 12 located within a predetermined distance from the host vehicle 11, from the sensor.

The interval setting unit 220 may set a predetermined interval in the left and right directions of the traveling direction of the host vehicle 11 as the first reference interval 20, and set an interval, which is a predetermined length larger than the first reference interval 20, as the second reference interval 30.

The first reference interval 20 and the second reference interval 30 may be set to different intervals depending on the driving circumstance of the host vehicle 11. For example, if the host vehicle 11 travels on a highway, the interval setting unit 220 may set the interval between the outer lines of the lanes on both sides of the host vehicle 11 as the first reference interval 20. The interval setting unit 220 may set the interval between the outer lines of the two lanes next to the lanes of the first inner ring 122 as the second reference interval 30. As another example, if the host vehicle 11 travels on a low-visibility rural road, the interval setting unit 220 may set a first reference interval 20 that is larger in left-right width than the first reference interval set for the highway. The interval setting unit 220 may set a second reference interval 30 that is larger in left-right width than the second reference interval set for the highway.

As described above, the collision risk reduction device 10 does not consider places other than the reference intervals and perform quicker computation. Further, the collision risk reduction device 10 may set different alarms for the first reference interval 20 and the second reference interval 30, thus intuitively transferring information to the user.

If the object 12 approaches within the second reference interval 30, the controller 230 may determine the type of the object 12 based on the information for the object 12 and set an alarm including the location and type of the object 12. If the object 12 approaches within the first reference interval 20, the controller 230 may set an alarm for avoidance from collision with the object 12 based on the type of the object 12. The controller 230 may control the output unit 240 to output the set alarm.

The controller 230 may determine that the object 12 is any one of a vehicle, a pedestrian, an obstacle, or an animal. Specifically, the controller 230 may determine the type of the object 12 based on information obtained through an image sensor, FMCW radar, or lidar system. The controller 230 may determine the type of the object 12 using big data based on, e.g., the location, type, image and state of the object 12. According to an embodiment, the controller 230 may determine the road width and curb in the direction in which the vehicle is to travel, using edges of the road.

If the object 12 approaches within the first reference interval 20, the controller 230 may set an alarm including at least one of the distance from the object 12, an expected point of collision, and time to collision. Specifically, the controller 230 may control to receive information for the object 12 from the receiver 210 and to set and output an alarm including at least one of the distance between the host vehicle and the object 12 approaching within the first reference interval, an expected point of collision between the object 12 and the host vehicle 11, and a time to collision between the object 12 and the host vehicle 11.

Figure 3:
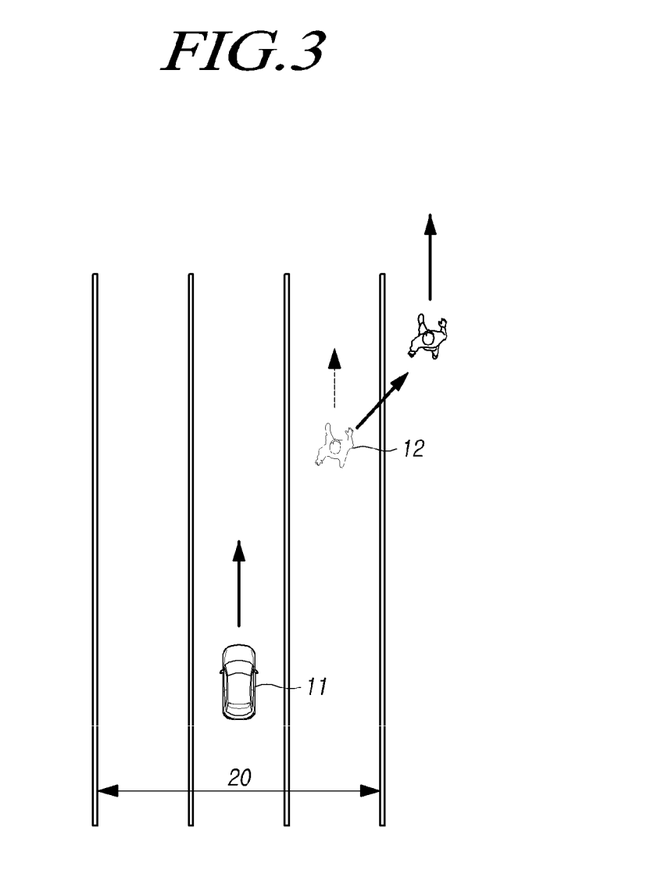
FIGS. 3 and 4 are views illustrating an example of refraining from setting an alarm depending on the type and movement of an object according to an embodiment of the disclosure.
Figure 4:
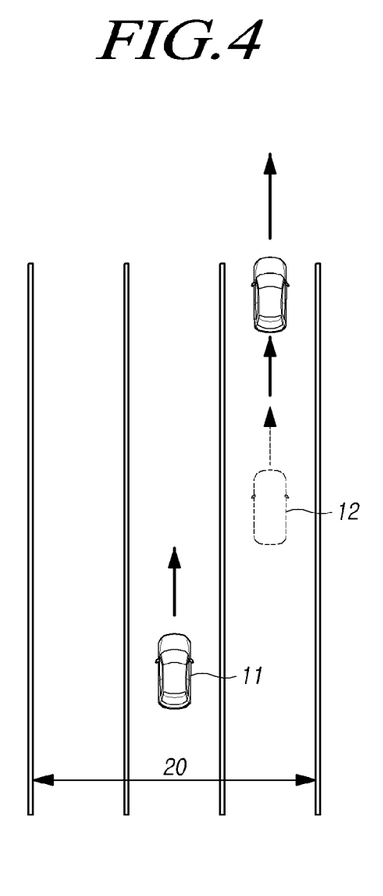

FIGS. 3 and 4 are views illustrating an example of refraining from setting an alarm depending on the type and movement of an object 12 according to an embodiment of the disclosure.

The controller 230 may set an alarm when a chance of collision exists, rather than setting an alarm for all movements of the object 12 12, for quicker computation. This setting may be previously made before driving or, in some contexts, may be made in real time as a result of determining the chance of collision by the controller 230. For example, when a crossing point occurs between the expected traveling path of the object 12 and the expected traveling path of the host vehicle 11, the controller 230 may determine that there is a chance of collision and set an alarm. If no such crossing point occurs, the controller 230 may refrain from setting an alarm.

Thus, the controller 230 may refrain from an alarm depending on the type of the object 12 and a specific circumstance.

Referring to FIG. 3, if the object 12 is a pedestrian, and the pedestrian travels away from the center of the host vehicle 11, the controller 230 may refrain from setting an alarm. For example, if a pedestrian is located on the left of the center of the host vehicle 11, and she travels to the left, the controller 230 may refrain from setting an alarm. As another example, if a pedestrian is located on the right of the center of the host vehicle 11, and she travels to the right, the controller 230 may refrain from setting an alarm.

Referring to FIG. 4, if the object 12 is a vehicle 12, and the vehicle 12 travels away from the center of the host vehicle 11 in the longitudinal direction, the controller 230 may refrain from setting an alarm. In this case, since there is no chance of collision between the host vehicle 11 and the object 12 although the expected traveling path of the host vehicle 11 is identical to the expected traveling path of the object 12, the controller 230 may not set an alarm. However, if the object 12 traveling away slows down and comes close to the object 12, the controller 230 may set an alarm for collision avoidance.

If the object 12 detected within the second reference interval 30 travels at a preset speed or higher in the direction approaching the first reference interval 20, the controller 230 may set an alarm for collision avoidance.

Specifically, the controller 230 may set an alarm including the location and type of the object 12 detected within the second reference interval 30 but, since the object 12 does not approach the first reference interval 20, may not set an alarm including more specific information. However, if the object 12 detected within the second reference interval 30 approaches the first reference interval 20, and the controller 230 sets an alarm upon detecting the object 12 within the first reference interval 20, the driver's response time may be insufficient. Thus, to secure a response time for collision avoidance, the controller 230 may set an alarm for collision avoidance if the object 12 approaches the first reference interval 20 at a preset speed or higher.

If no alarm is set even when the object 12 is present within the first reference interval 20, the controller 230 may set an alarm to indicate the risk of collision with the object 12 through a predetermined lane interval. For example, if the host vehicle 11 travels in one lane of a two-lane road, the first reference interval 20 may be set up to the other lane beyond the center line. In this case, the controller 230 does not set an alarm although the object 12 approaches within the first reference interval 20. However, the controller 230 may detect the movement of the object 12 within the first reference interval 20, determine whether the object 12 approaches a lane interval set in the first reference interval 20, and set an alarm to indicate the risk of collision.

If the time to collision between the object 12 and the host vehicle 11 is a threshold or less, the controller 230 may set a lane change alarm for the host vehicle 11. If the controller 230 determines that the time to collision between the host vehicle 11 and the object 12 approaching the first reference interval 20 is too short to avoid collision by acceleration or deceleration or there is an obstacle, the controller 230 may set a lane change alarm for the host vehicle 11. If the controller 230 determines that the host vehicle 11 has no space to change lanes due to presence of other vehicles in both the left and right lanes in the above-described circumstance, the controller 230 may set an alarm to minimize a collision with the approaching object 12.

As described above, the collision risk reduction device 10 sets a different alarm depending on the type of the object 12 and may thus more correctly determine the circumstance of the surroundings and set an alarm for the risk of collision while refraining from setting an alarm in circumstances where there is no hazard.

Figure 5:
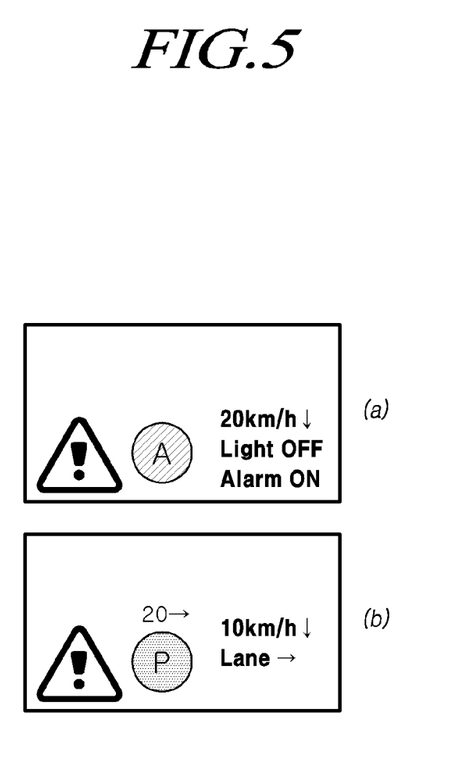
FIG. 5 is a view illustrating the results of outputting an alarm for an object approaching within a first reference interval according to an embodiment of the disclosure.

FIG. 5 is a view illustrating the results of outputting an alarm for an object 12 approaching within a first reference interval 20 according to an embodiment of the disclosure.

Referring to FIG. 5(a), the controller 230 may set an alarm for an object 12 approaching within the first reference interval 20 and control the output unit 240 to output the set alarm. The control part 230 sets an alarm including an exclamation mark which indicates a warning, A which indicates the type (e.g., animal) of the object 12, 20 km/h↓, which instructs to reduce the speed of the host vehicle 11 to 20 km/h or less, Light OFF, which instructs to turn off the headlights, and Alarm ON, which instructs to honk the horn.

Referring to FIG. 5(b), the controller 230 may set an alarm including P, which indicates a pedestrian, 20→, which indicates approach from 20 m away to the left, and Lane→, which instructs to change to the right lane. In addition to the upper, lower, left, and right arrows, the controller 230 may include '↖, ↗, ↙ or ↘' to indicate an object 12 approaching from a diagonal direction.

The above-described alarm may be set only for the object 12 closest to the host vehicle 11 or for all of the objects 12 approaching within the first reference interval 20.

Figure 6:
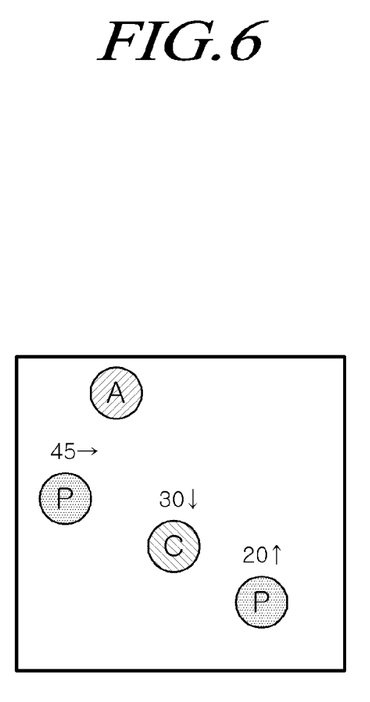
FIG. 6 is a view illustrating the results of outputting an alarm for an object approaching within a second reference interval according to an embodiment of the disclosure.

FIG. 6 is a view illustrating the results of outputting an alarm for an object 12 approaching within a second reference interval 30 according to an embodiment of the disclosure.

The controller 230 may set an alarm to be output in a location meeting a preset condition according to the location of the object 12. Referring to FIG. 6, the controller 230 may set an alarm to display an object 12 approaching the host vehicle 11 in a two dimension (2D) square plane. The controller 230 may set an alarm to output an object 12, approaching from the left of the host vehicle 11, to the left, objects 12, approaching from the front and the rear, in the center, and an animal, detected within the second reference interval 30, to the north side. Here, C means a car. The reason why the alarm is set to output the animal to the north side regardless of the location where the animal is detected is that the animal's movement is difficult to predict and runs into an unexpected circumstance. Here, the object 12, which approaches in the longitudinal direction from the front, may mean that there is no clear dividing line between lanes, and the road is narrowed. Such a location is merely an example, and is not limited to a specific direction, and representations are not limited to arrows or letters.

If the road reduces by a predetermined width or more in front of the host vehicle 11, the controller 230 may set an alarm to indicate it.

Figure 7:
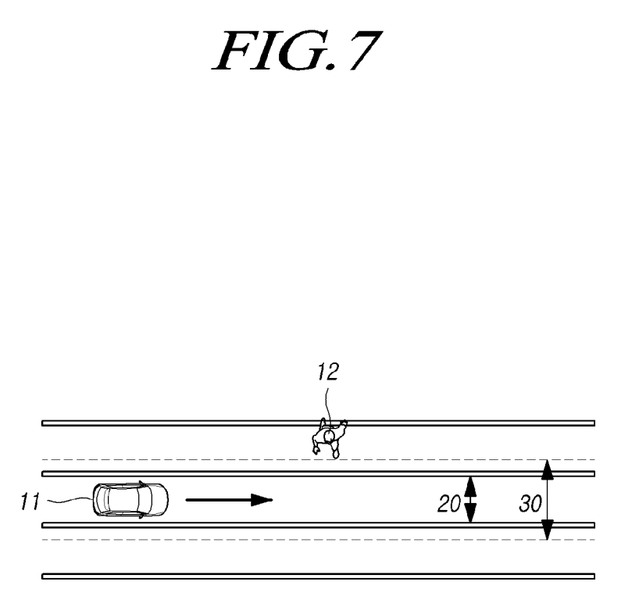
FIG. 7 is a view illustrating an example of controlling, smart cruise control (SCC) driving of a host vehicle in response to an object approaching within a second reference interval according to an embodiment of the disclosure.

FIG. 7 is a view illustrating an example of controlling, smart cruise control (SCC) driving of a host vehicle 11 in response to an object 12 approaching within a second reference interval 30 according to an embodiment of the disclosure.

Referring to FIG. 7, if an object 12 approaches within a second reference interval 30 while the host vehicle 11 travels using smart cruise control (SCC), the controller 230 may control the host vehicle 11 to perform automatic emergency braking (AEB). Upon detecting an object 12 moving within a predetermined distance (preferably within 50 m) during SCC driving, the controller 230 may control the host vehicle 11 to limit the SCC acceleration (preferably to 80%) although the object 12 does not approach within the second reference interval 30.

If a stationary object (not shown) is located within the second reference interval 30 and is expected to move in a predetermined time, the controller 230 may set an alarm including the location and type of the object based on information for the stationary object and, if the stationary object is located within the first reference interval 20, and is expected to move in a predetermined time, set an alarm for avoiding collision with the object based on the information for the stationary object.

Specifically, the controller 230 may receive information for the stationary object and determine whether the stationary object is expected to move in a predetermined time. For example, if the stationary object partially protrudes, and the protruding part is determined as a door of a vehicle, the controller 230 may determine that the stationary object is expected to move in a predetermined time. As another example, if the stationary object is determined to be a vehicle, and an object determined to be a pedestrian is located around the stationary object, the controller 230 may determine that the stationary object is expected to move in a predetermined time. In a combination of the above examples, if an object, which is determined to be a pedestrian, is located around a stationary object, which is determined to be a vehicle with a door open, the controller 230 may determine that the stationary object is expected to move in a predetermined time. As another example, when a crosswalk is present within a predetermined distance from the host vehicle, and a stationary object, determined to be a pedestrian, is located around the crosswalk, the controller 230 may determine that the stationary object is expected to move in a predetermined time. Although the crosswalk is not present, if a stationary object determined to be a pedestrian around the driving lane, the controller 230 may determine that the stationary object is expected to move in a predetermined time. The direction in which the stationary object is expected to be headed may be determined based on a gesture or pose taken by the object and the center of gravity of the object.

The controller 230 may regard a stationary object, which is expected to move, as a moving object and set an alarm according to a reference interval where the stationary object is located. For example, if the stationary object is located within the second reference interval 30, the controller 230 may set an alarm including the location and type of the stationary object. As another example, if the stationary object is located within the first reference interval 20, the controller 230 may set an alarm for avoidance of collision between the stationary object and the host vehicle. The expected time of collision may be calculated from the moment that the condition where the object stops is released. For example, when the condition where the object stops is released may include when the stationary object, determined to be a pedestrian, is allowed to cross on the crosswalk as traffic signal changes, when the door of the stationary object, determined to be a vehicle, is closed, or when the stationary object, determined to be a pedestrian around a vehicle, gets in the vehicle.

As described above, the collision risk reduction device 10 may reduce the risk of unexpected collision by previously determining an object 12 expected to move.

The output unit 240 may receive the information for the alarm from the controller 230 and output the information for the alarm. The output unit 240 may include an audio-video-navigation (AVN) for output.

The output unit 240 may include a head-up display (HUD) module that is equipped in the host vehicle 11 and outputs the information for the alarm received from the controller 230.

The output unit 240 may output the alarm according to the location of the object 12 in a location meeting a preset condition.

As described above, the collision risk reduction device 10 may include brief information for collision avoidance and provide the brief information, thereby transferring information in a more intuitive manner.

According to the disclosure, the collision risk reduction device 10 may be implemented as an electronic control unit (ECU). The ECU may include at least one or more of one or more processors, a memory, a storage unit, a user interface input unit, or a user interface output unit which may communicate with one another via a bus. The ECU may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

Described below is a method for reducing the risk of collision using the collision risk reduction device 10 capable of performing all of the above-described operations or functions.

Figure 8:
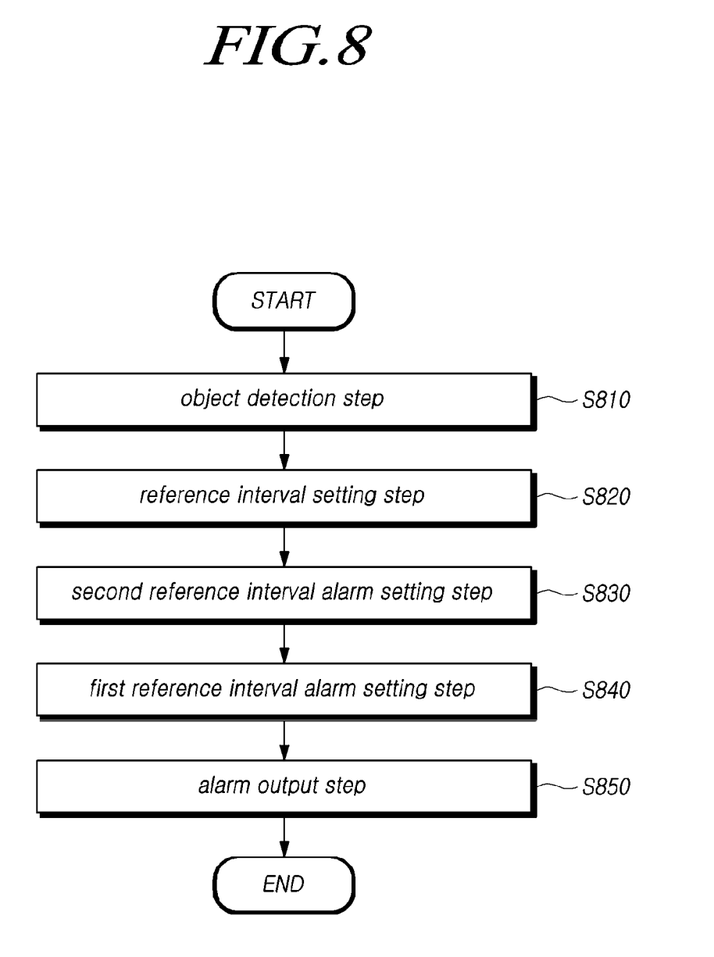
FIG. 8 is a flowchart illustrating a collision risk reduction method according to an embodiment of the disclosure.

FIG. 8 is a flowchart illustrating a collision risk reduction method according to an embodiment of the disclosure.

Referring to FIG. 8, according to the disclosure, a method for reducing a risk of collision may comprise an object detection step S810 receiving object information for an object 12 approaching within a predetermined distance of a host vehicle 11, a reference interval setting step S820 setting an interval predetermined in left and right directions of a traveling direction of the host vehicle 11, as a first reference interval, and setting an interval, which is a predetermined length larger than the first reference interval 20, as a second reference interval 30, a second reference interval alarm setting step S830 determining a type of the object 12 based on the object information if the object 12 approaches within the second reference interval 30 and setting an alarm including the type and location of the object 12, a first reference interval alarm setting step S840 setting an alarm for avoiding collision with the object 12 based on the type of the object 12 if the object approaches within the first reference interval 20, and an alarm output step S850 controlling to output the set alarms. The type of the object may be determined to be any one of a vehicle, a pedestrian, an obstacle, or an animal.

If the object 12 approaches within the first reference interval 20, the first reference interval alarm setting step (S840) may set an alarm including at least one of a distance from the object 12, an expected point of collision with the object 12, or a time to collision.

If the object 12 is a pedestrian, and the pedestrian moves away from a center of the host vehicle 11, the first reference interval alarm setting step (S840) may refrain from setting the alarm.

If the object 12 is a vehicle and moves away from a center of the host vehicle 11 in a longitudinal direction, the first reference interval alarm setting step (S840) may refrain from setting the alarm.

If the object 12 detected in the second reference interval 30 moves at a preset speed in a direction approaching the first reference interval 20, the second reference interval alarm setting step (S830) may set an alarm for risk avoidance. If a time to collision between the object 12 and the host vehicle 11 is a threshold or less, the second reference interval alarm setting step may set a lane change alarm for the host vehicle 11.

The alarm output step S850 may output the information for the set alarm through an HUD module provided in the host vehicle 11.

The alarm output step S850 may output an alarm according to a location of the detected object 12 in a location meeting a preset condition.

The object detection step S810 may further receive information for a stationary object 12 located within a predetermined distance from the host vehicle 11, from the sensor.

If the stationary object is located within the second reference interval 30 and is expected to move in a predetermined time, the second reference interval alarm setting step S830 may set an alarm including the type and location of the object 12 based on the information for the stationary object.

If the stationary object is located within the first reference interval 20 and is expected to move in a predetermined time, the first reference interval alarm setting step S840 may set the alarm for avoiding collision with the stationary object.

As set forth above, according to the disclosure, the collision risk reduction device 10 may set an alarm depending on a preset interval and the type of an object. Thus, it is possible to provide a collision risk reduction device and method that may set an alarm for rapid and precise collision avoidance.

The technology of providing the collision risk reduction device and method may be implemented as an application or in the form of program instructions executable through various computer components, which may then be recorded in a computer-readable recording medium. The computer-readable medium may include programming commands, data files, or data structures, alone or in combinations thereof.

The programming commands recorded in the computer-readable medium may be specially designed and configured for the disclosure or may be known and available to one of ordinary skill in the computer software industry.

Examples of the computer readable recording medium may include, but is not limited to, magnetic media, such as hard disks, floppy disks or magnetic tapes, optical media, such as CD-ROMs or DVDs, magneto-optical media, such as floptical disks, memories, such as ROMs, RAMS, or flash memories, or other hardware devices specially configured to retain and execute programming commands.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A device for reducing a risk of collision, the device comprising: a
   receiver receiving, from a sensor, object information for an object approaching within a predetermined distance of a host vehicle;
   an interval setting unit setting an interval predetermined in left and right directions of a traveling direction of the host vehicle, as a first reference interval, and setting an interval, which is a predetermined length larger than the first reference interval, as a second reference interval;
   a controller determining a type of the object based on the object information when the object approaches within the second reference interval and setting an alarm including the type and location of the object and, when the object approaches within the first reference interval, setting an alarm for avoiding collision with the object based on the type of the object; and
   an output unit outputting the set alarms,
   wherein the receiver further receives information for a stationary object located within the predetermined distance from the host vehicle, wherein, when the stationary object located within the predetermined distance from the host vehicle is determined to be a vehicle with a partially protruding part, the partially protruding part is determined to be an open door, and the object is determined to be a pedestrian approaching the vehicle, then the controller determines the stationary object moves to a different location in a predetermined time and sets the alarm for avoiding collision based on information on the stationary object.

2. The device of claim 1, wherein when the object approaches within the first reference interval, the controller sets an alarm including at least one of a distance from the object, an expected point of collision, or a time to collision.

3. The device of claim 1, wherein the type of the object is determined to be any one of a vehicle, a pedestrian, an obstacle, or an animal.

4. The device of claim 3, wherein when the object is a pedestrian, and the pedestrian moves away from a center of the host vehicle, the controller refrains from setting the alarm.

5. The device of claim 3, wherein when the object is a vehicle and moves away from a center of the host vehicle in a longitudinal direction, the controller refrains from setting the alarm.

6. The device of claim 1, wherein when the object detected in the second reference interval moves at a preset speed in a direction approaching the first reference interval, the controller sets an alarm for risk avoidance.

7. The device of claim 6, wherein when a time to collision between the object and the host vehicle is a threshold or less, the controller sets a lane change alarm for the host vehicle.

8. The device of claim 1, wherein the output unit includes a head-up display (HUD) module that is provided in the host vehicle and outputs information for the alarm received from the controller.

9. The device of claim 1, wherein the output unit outputs an alarm according to a location of the detected object in a location meeting a preset condition.

10. The device of claim 1, wherein when the stationary object is located within the second reference interval and the controller determines the stationary object may move in a predetermined time based on at least the information for the stationary object, the controller sets an alarm including the type and location of the object based on the information for the stationary object and, when the stationary object is located within the first reference interval and the controller determines the stationary object may move in a predetermined time based on at least the information for the stationary object, the controller sets the alarm for avoiding collision with the stationary object.

11. A method for reducing a risk of collision, the method comprising:
an object detection step receiving, from a sensor, object information for an object approaching within a predetermined distance of a host vehicle;
a reference interval setting step setting an interval predetermined in left and right directions of a traveling direction of the host vehicle, as a first reference interval, and setting an interval, which is a predetermined length larger than the first reference interval, as a second reference interval;
a second reference interval alarm setting step determining a type of the object based on the object information when the object approaches within the second reference interval and setting an alarm including the type and location of the object;
a first reference interval alarm setting step setting an alarm for avoiding collision with the object based on the type of the object when the object approaches within the first reference interval; and
an alarm output step controlling to output the set alarms,
wherein the object detection step further receives information for a stationary object located within the predetermined distance from the host vehicle,
wherein when the stationary object located within the predetermined distance from the host vehicle is determined to be a vehicle with a partially protruding part, the partially protruding part is determined to be an open door, and the object is determined to be a pedestrian approaching the vehicle, then the first reference interval alarm setting step comprises determining the stationary object moves to a different location in a predetermined time and setting the alarm for avoiding collision based on information on the stationary object.

12. The method of claim 11, wherein when the object approaches within the first reference interval, the first reference interval alarm setting step sets an alarm including at least one of a distance from the object, an expected point of collision, or a time to collision.

13. The method of claim 11, wherein the type of the object is determined to be any one of a vehicle, a pedestrian, an obstacle, or an animal.

14. The method of claim 13, wherein when the object is a pedestrian, and the pedestrian moves away from a center of the host vehicle, the first reference interval alarm setting step refrains from setting the alarm.

15. The method of claim 13, wherein when the object is a vehicle and moves away from a center of the host vehicle in a longitudinal direction, the first reference interval alarm setting step refrains from setting the alarm.

16. The method of claim 11, wherein when the object detected in the second reference interval moves at a preset speed in a direction approaching the first reference interval, the second reference interval alarm setting step sets an alarm for risk avoidance.

17. The method of claim 16, wherein when a time to collision between the object and the host vehicle is a threshold or less, the second reference interval alarm setting step sets a lane change alarm for the host vehicle.

18. The method of claim 11, wherein the alarm output step outputs information for the set alarm through a head-up display (HUD) module provided in the host vehicle.

19. The method of claim 11, wherein the alarm output step outputs an alarm according to a location of the detected object in a location meeting a preset condition.

20. The method of claim 11, wherein when the stationary object is located within the second reference interval and the second reference interval alarm setting step determines the stationary object may move in a predetermined time based on at least the information for the stationary object, the second reference interval alarm setting step sets an alarm including the type and location of the object based on the information for the stationary object and, wherein when the stationary object is located within the first reference interval and the first reference interval alarm setting step determines the stationary object may move in a predetermined time based on at least the information for the stationary object, the first reference interval alarm setting step sets the alarm for avoiding collision with the stationary object.

* * * * *